United States Patent [19]

Bowling

[11] Patent Number: 5,638,619

[45] Date of Patent: Jun. 17, 1997

[54] PROTECTIVE OPERATOR'S STATION FOR A REMOTELY CONTROLLED STUMP CUTTER OR SIMILAR APPARATUS

[76] Inventor: John M. Bowling, 9376 Lincoln Way East, Orrville, Ohio 44667

[21] Appl. No.: 367,782

[22] Filed: Dec. 29, 1994

[51] Int. Cl.⁶ .................................. A01B 13/00; B27L 1/05
[52] U.S. Cl. ............................ 37/302; 37/466; 83/DIG. 1
[58] Field of Search .......................... 37/302, 348, 466; 414/909; 455/128, 90; 108/90, 116, 150, 60; 144/334, 2 N, 251 R; 241/37.5; 74/608, 609, 612; 89/1.13, 36.05, 36.01; 109/49.5; 446/425; 266/903; 83/DIG. 1; 451/451

[56] References Cited

U.S. PATENT DOCUMENTS

| | | | |
|---|---|---|---|
| 1,448,171 | 3/1923 | Waderlow | 108/116 |
| 3,174,629 | 3/1965 | Gelberg et al. | 108/60 X |
| 3,661,204 | 5/1972 | Blanding et al. | |
| 3,738,405 | 6/1973 | Ericson | 108/90 X |
| 3,906,369 | 9/1975 | Pitman et al. | |
| 4,032,883 | 6/1977 | Gibson | |
| 4,034,633 | 7/1977 | Petersen | 144/251 R X |
| 4,041,394 | 8/1977 | Pate | |
| 4,090,736 | 5/1978 | Finney | 299/30 |
| 4,140,229 | 2/1979 | Booth et al. | 414/909 X |
| 4,172,615 | 10/1979 | Hakes | 299/30 |
| 4,281,876 | 8/1981 | Lansberry | 299/1.4 |
| 4,286,262 | 8/1981 | Wahl | 455/128 X |
| 4,306,314 | 12/1981 | Griffiths | |
| 4,430,652 | 2/1984 | Rothenbuler et al. | |
| 4,543,021 | 9/1985 | Adler | 74/608 X |
| 4,578,907 | 4/1986 | Cayley et al. | 451/451 |
| 4,621,375 | 11/1986 | Simnovec | |
| 4,700,914 | 10/1987 | Cheetham | 108/150 X |
| 4,818,990 | 4/1989 | Fernandes | |
| 5,087,099 | 2/1992 | Stolarczyk | |
| 5,174,350 | 12/1992 | Johansson | |
| 5,181,934 | 1/1993 | Stolarczyk | |
| 5,203,388 | 4/1993 | Bowling | |
| 5,289,859 | 3/1994 | Minton, Jr. et al. | |
| 5,415,417 | 5/1995 | Reis, Jr. | 446/425 X |
| 5,419,380 | 5/1995 | Bot | 37/302 X |

Primary Examiner—Terry Lee Melius
Assistant Examiner—Thomas A. Beach
Attorney, Agent, or Firm—Oldham & Oldham Co., LPA

[57] ABSTRACT

The present invention is directed to a protective operator's station from which a machine operator may safely and effectively remotely control the various operations of a machine that may create flying debris. The invention includes a control panel mounted to an adjustable base, such as a tripod with extensible legs. The invention also includes one or more shields to protect the machine operator from flying debris. A substantially transparent shield is provided to protect the upper body and head of a machine operator without substantially impairing the operator's vision. A flexible lower shield or skirt may be provided to protect the lower body of the operator. In an alternative embodiment, the control panel, including one or more shields, may be secured to the body of the machine operator using a harness. The invention also relates to an improved remotely controlled stump cutter having a protective operator's station. The stump cutter may be provided with a detachable protective operator's station allowing the operator to detach the operator's station and remotely operate the stump cutter when desired or when conditions require.

14 Claims, 3 Drawing Sheets

PROTECTIVE OPERATOR'S STATION FOR A REMOTELY CONTROLLED STUMP CUTTER OR SIMILAR APPARATUS

FIELD OF THE INVENTION

This invention relates generally to a protective operator's station to be used in conjunction with a remotely controlled item of machinery, and also to a stump cutting apparatus including a protective operator's station for remotely controlling the stump cutting operations.

BACKGROUND OF THE INVENTION

In utilizing high speed cutting, drilling, grinding, or similar machines, such as stump cutting machines, it is very important that the operator be provided with a suitable operator's station from which to control the operations of the machine. The operator must have responsive controls, must have a good vantage point from which to view the machine operations, and must be provided with protection from various dangers including the danger of flying debris resulting from machine operations. Prior stump cutting machines, and other flying debris causing machines have been provided with protective operator stations connected to the machine utilizing a swinging boom and a wired, hydraulic, or other similar connection to the machine being controlled. Such an arrangement allows an operator only a limited ability to vary the position of the machine controls to more clearly and safely view the machine operations.

However, these prior operator stations are connected to the machine being controlled and therefore, the movement of the operators station is limited. Also, due to the swinging nature of the boom, these prior systems often may not allow the machine operator to position the operator's station exactly where desired, especially in areas of heavy brush, trees, or when the stump cutter is located adjacent to a structure such as a house, barn, or a fence. In certain stump cutting situations, the stump to be removed may be adjacent to a house or similar structure, offering an obstructed view from many conventional operator angles and requiring the machine operator to be careful so as not to damage the nearby structure. In this situation, the operator must be able to choose a vantage point for operating the machine which allows him or her to see all movements of the machine, and often must be close to the cutting element or other active machine components.

Another prior system utilizes a hand-held portable control panel connected to the machine being controlled using wires. While this type of control panel does allow the machine operator to move around, the operator may not be able to get as close to the cutting operations as may be required because the operator has no protection from flying debris created by the machine operations. An operator using such a hand-held operator's station without a shield is not able to safely approach the work, and must concentrate on avoiding flying debris, rather than on the task at hand. Also, an operator concerned with avoiding flying debris may forget to ensure that the control wires do not become entangled in the moving components of the machine. Such an accident could result in equipment damage and more significantly, operator injury.

SUMMARY OF THE INVENTION

The present invention is therefore directed to a protective operator's station from which an operator may control the operation of a machine, wherein the operator's station comprises: a control panel including at least one machine control switch; a base for supporting the control panel in a position desired by an operator; and, shield means, connected to the protective operator's station, for shielding at least a portion of the operator from flying debris generated by the machine being controlled. In a preferred embodiment, the base is vertically adjustable to allow a machine operator to position the control panel at a desired height, and the control panel may also be rotatably mounted to the base to allow an operator to swivel the control panel as desired. The shield means for protecting an operator preferably comprises at least a first substantially transparent shield extending upward from the control panel region of the apparatus to protect the upper body region of a machine operator using the protective operator's station. The shield means preferably further comprises a skirt extending downward from the control panel region to protect at least a portion of an operator's lower body. The base may be provided in the form of a folding stand such as a tripod including extensible legs to allow the base to be easily transported and to provide a steady base for the control panel.

In an alternative embodiment, the present invention may be provided in a more portable form, wherein the control panel is connected to a harness, rather than a base, to allow an operator to suspend the control panel from his or her body at a desired height so that the operator may easily move about as desired. A unipod or similar stand may connected to the control panel to allow an operator to rest the control panel thereon as desired to reduce the amount of weight being directly supported by the operator.

The invention is also directed to an improved remotely controlled stump cutting apparatus having a rotating cutting wheel mounted on an end of a cutting boom, the cutting wheel including a plurality of radially extending cutting teeth circumferentially secured about the periphery thereof; and, a power source for powering the cutting wheel, wherein the improvement comprises: a protective operator's station including a control panel having at least one machine control switch; a base for supporting said control panel in a position desired by an operator; and, shield means, connected to said protective operator's station, for shielding at least a portion of said operator from flying debris generated by said machine.

DETAILED DESCRIPTION OF THE INVENTION

Figure 1:
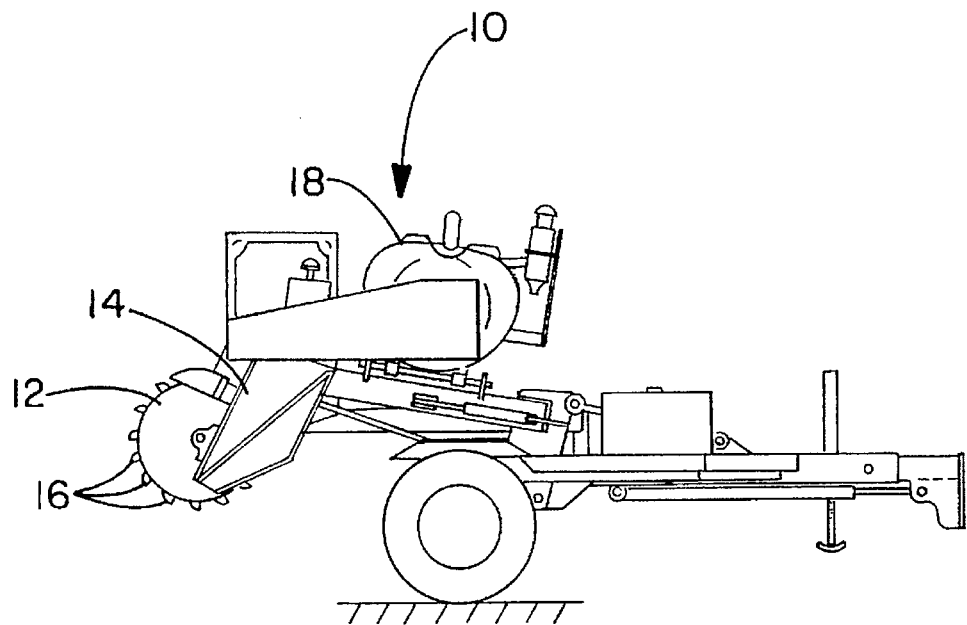
FIG. 1 is an elevational view of a stump cutter.

Reference will now be made in detail to the preferred embodiments of the invention, examples of which are illustrated in the accompanying drawings. Wherever possible, the same reference numerals will be used throughout the drawings to refer to the same or like parts.

Figure 1A:
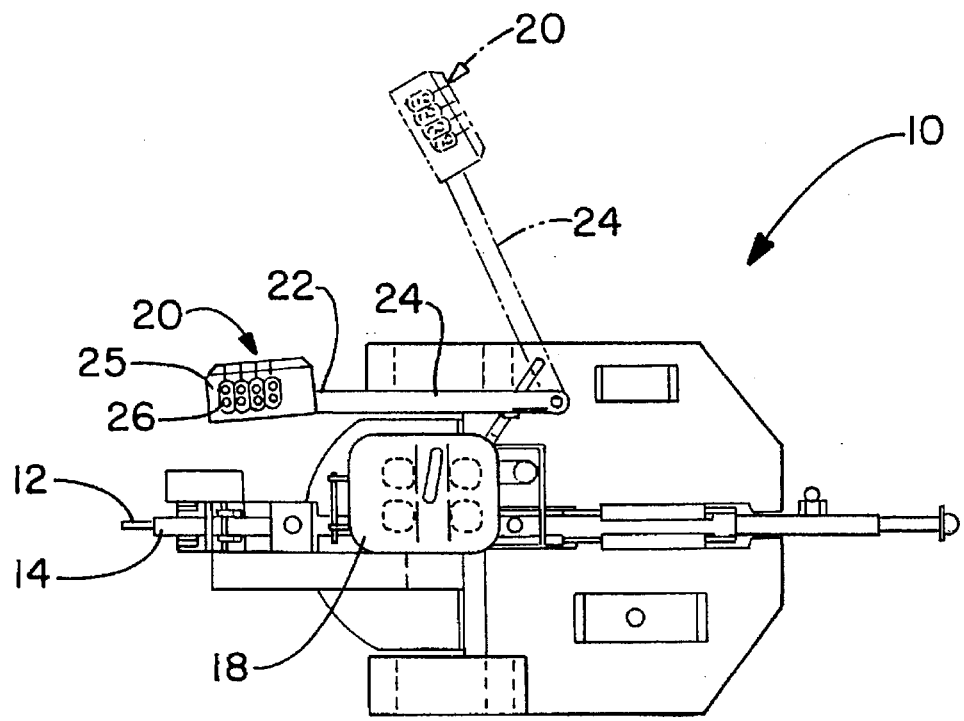
FIG. 1A is a top plan view of the stump cutter shown in FIG. 1.

Referring to FIGS. 1 and 1A, a known stump cutter is shown generally at 10 and comprises a rotating cutting wheel 12 mounted on an end of a cutting boom 14. The cutting wheel 12 includes a plurality of radially extending cutting teeth 16 circumferentially secured about the periphery thereof; and, a power source such as a gasoline or diesel engine 18 for powering the cutting wheel 12. The illustrated stump cutter is a model RG 1670 DC manufactured and sold by Rayco Manufacturing, Inc. of Wooster, Ohio. The basic elements are representative of the general state of the art in stump cutters. In FIG. 1A, operator's station 20 of stump cutter 10 can be seen and is secured to an end 22 of a swinging boom 24. Operator's station comprises a control panel 25 including a plurality of control switches 26 connected to the control system of stump cutter 10 utilizing a variety of means such as electrical wires, hydraulic lines, fiber optic cables, and other suitable means. By manipulating control switches 26, a machine operator can cause stump cutter 10 to perform various operations such as raising or lowering boom 14, starting or stopping rotation of curing wheel 12, and increasing or decreasing speed of engine 18. Boom 24 swings as indicated in FIG. 1a to allow a machine operator to position control station 20 at any point desired along its arc. However, it can be seen that the choices for the placement of operator's station 20 are limited. For example, in certain circumstances, it may be more desirable and safe for an operator to be able to control the stump cutter 10 from the opposite side of the machine 10.

Figure 2:
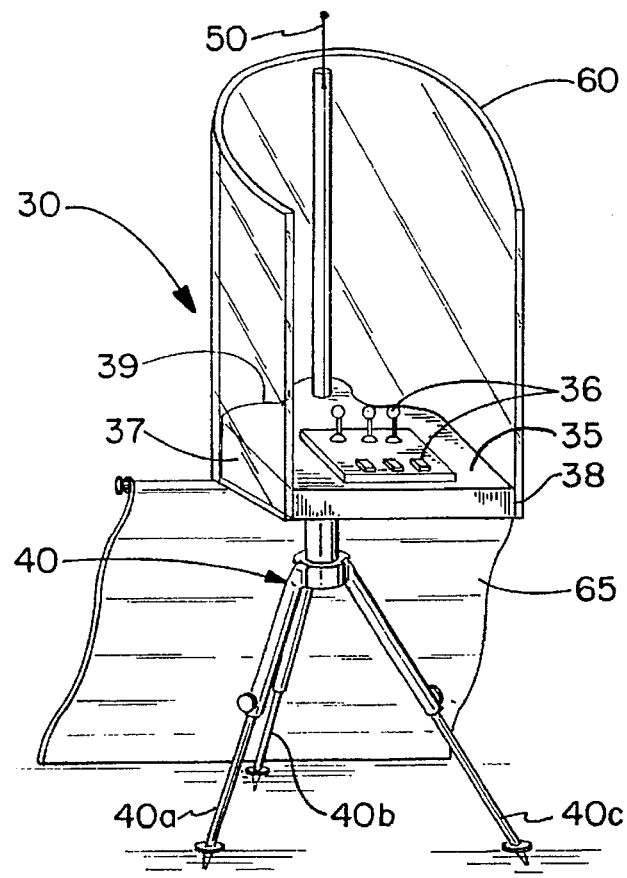
FIG. 2 is a perspective view of a preferred embodiment of the present invention.

The protective operator's station of the present invention is shown generally at 30 in FIG. 2 and may control certain functions of stump cutter 10 using wires, hydraulic lines, optic cables, or any other suitable means so as to be substantially detached from stump cutter 10. However, by way of example only, the invention will be described in terms of a remote, wireless communication between operator's station 30 and control system of stump cutter 10 wherein operator's station 30 is completely detached from stump cutter 10.

Protective operator's station 30 comprises a control panel 35 including a variety of control switches 36 to be used by a machine operator to cause control panel 35 to generate control signals to be transmitted to the control system of stump cutter 10 such that upon receiving signals, stump cutter 10 performs operations as desired by the machine operator. For example, stump cutter 10 may include a hydraulic system for controlling the machine operations, and a control signal receiver for receiving control signals transmitted from operator's station 30. The control signal receiver of stump cutter 10 may be connected to a solenoid-actuated hydraulic valve bank of stump cutter 10 to control the flow of the hydraulic fluid to the various components of stump cutter 10.

Control panel 35 is supported for use upon a base 40 which in the preferred embodiment is a tripod including selectively extensible legs 40a, 40b, 40c. Tripod base 40 including extensible legs 40a, 40b, 40c is thought preferable to provide adequate support for control panel 35 even when the operator's station 30 is being utilized on uneven terrain. Control panel 35 may be rotatably mounted upon base 40 to provide a machine operator with the ability to swivel control panel 35 upon base 40 to any position desired.

Control panel 35 includes means therein for generating control signals in response to manipulation of control switches 36. Signals generated within control panel 35 are preferably transmitted via radio frequency energy, infrared energy, or other suitable wireless media, through an antenna 50 or similar means to a control signal receiver of a nearby machine being controlled such as stump cutter 10. For example, by manipulating control switches 36, an operator can cause a control signal to be transmitted from antenna 50 to stump cutter 10 that causes cutting wheel 12 to start or stop rotating. However, as discussed, protective operator's station 30 may be connected to stump cutter 10 by wires, hydraulic lines, or other similar means so as to be only substantially detached from stump cutter 10 or similar machine, and the invention is not meant to be limited to a wireless, detached arrangement as shown.

The protective operator's station 30 preferably includes a first shield 60 connected to and extending upward from the control panel region a sufficient height to protect a machine operator and preferably at least his or her eyes, from flying debris generated by stump cutter 10. Shield 60 is therefore preferably made from a substantially transparent material such as clear plastic, safety glass, or other suitable see-through material. Shield 60 may be curved or straight and extends across a substantial portion of front 39 and preferably along at least part of sides 37,38 of control panel 35. Shield 60 is necessary on debris throwing machines such as stump cutter 10 and other high speed cutting machines to protect a machine operator from flying debris. An apparatus without a shield 60 may provide a dangerous environment for a machine operator. Also, a machine operator having the benefit of a shield 60 may be able to more closely approach the work being done to better view and control the machine operations, especially for performing work in restricted spaces where a stump is adjacent to other trees or a structure such as a house or a fence.

A second shield or skirt 65 is preferably also provided and extends downward from control panel 35 to protect the lower body region of a machine operator. Skirt 65 is preferably connected to control panel 35 and extends across a substantial portion of front 39 and preferably beyond sides 37,38 of control panel 35 to provide the operator with additional protection from flying debris. Skirt 65 is preferably made from a flexible material or heavy fabric such as canvas, nylon, heavy plastic, rubber, or other suitable material so that it will not interfere with legs 40a, 40b, 40c of base 40, and so that skirt 65 will not interfere with raising, lowering, or swiveling of control panel 35. Forming skirt 65 of a flexible material also provides an operator's station 30 that is more easy to transport. Shield 60 and/or skirt 65 may be permanently attached to control panel 35 or either may be attached to control panel utilizing fasteners that allow shield 60 or skirt 65 to be easily attached or detached from control panel 35 to allow for easy transport and quick assembly and disassembly of the protective operator's station 30.

Figure 3:
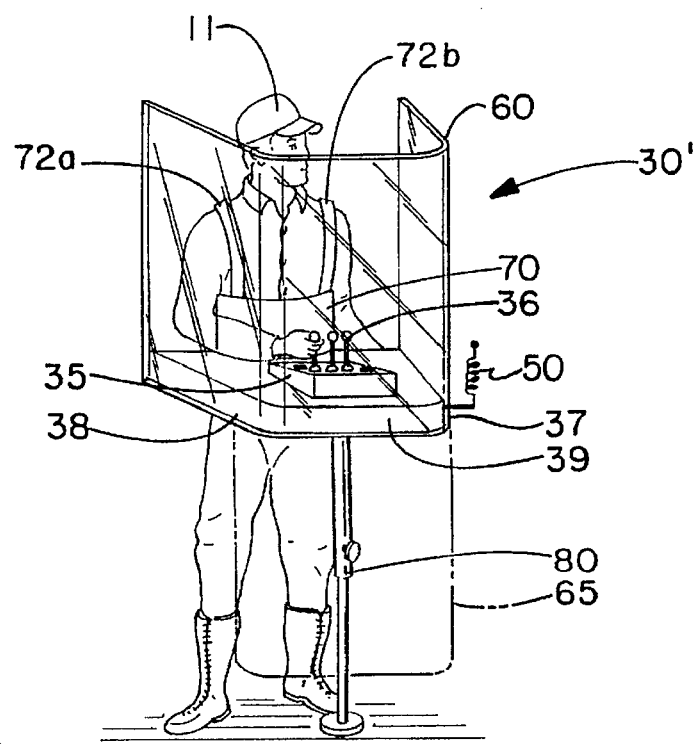
FIG. 3 is a perspective view of an alternative embodiment of the invention.

Referring now to FIG. 3, there can be seen an alternative embodiment of the present invention shown generally at 30' as comprising a control panel 35 including various machine control switches 36 thereon. Manipulation of control switches 36 by machine operator 11 causes control panel 35 to generate control signals to be transmitted through antenna 50 or similar means to a receiver located on a machine being controlled. The control signals may be transmitted utilizing radio frequency energy or other suitable wireless media. Alternatively, as discussed above, the operator's station 30' may be connected to the machine being controlled, such as stump cutter 10, through a wired connection, hydraulic lines, or any other suitable connection so as to be only substantially detached from stump cutter 10 or other similar machine. The invention 30' is designed to be worn by an operator 11 with the aid of a harness 70 including adjustable shoulder straps 72a, 72b allowing the operator 11 to position the control panel 35 as desired on his or her body 11. A support member such as unipod 80 may be connected to control panel 35 to allow the operator 11 to rest control panel 35 thereon to reduce the weight being supported by operator through harness 70.

Apparatus 30' preferably includes a first shield 60 connected to and extending upward from the control panel 35 a sufficient height to protect machine operator 11 and preferably at least his or her eyes, from flying debris generated by the machine being controlled, such as a stump cutter 10. Shield 60 is therefore preferably made from a substantially transparent material such as clear plastic, safety glass, or other suitable see-through material and preferably extends across a substantial portion of front 39 and preferably along at least a portion of sides 37,38 of control panel 35.

A second shield or skirt 65 is preferably also connected to and extends downward from control panel 35 to protect at least a potion of the lower body region of machine operator 11. Skirt 65 extends across a substantial portion of front 39 of control panel 35 and may extend beyond the sides 37,38 thereof to provide operator 11 with additional protection. Skirt 65 is preferably made from a flexible material or fabric such as canvas, nylon, heavy plastic, rubber, or other suitable material so that it is lightweight and will not interfere with the movements of operator 11, and so that the apparatus 30' may be more easily transported. Shield 60 and/or skirt 65 may be permanently attached to control panel 35 or either may be attached utilizing fasteners allowing for easy attachment and detachment of shield 60 or skirt 65. Providing the apparatus with easily attached and detached shields provides for more compact transport of the apparatus 30' and for quick assembly and disassembly thereof.

Figure 4:
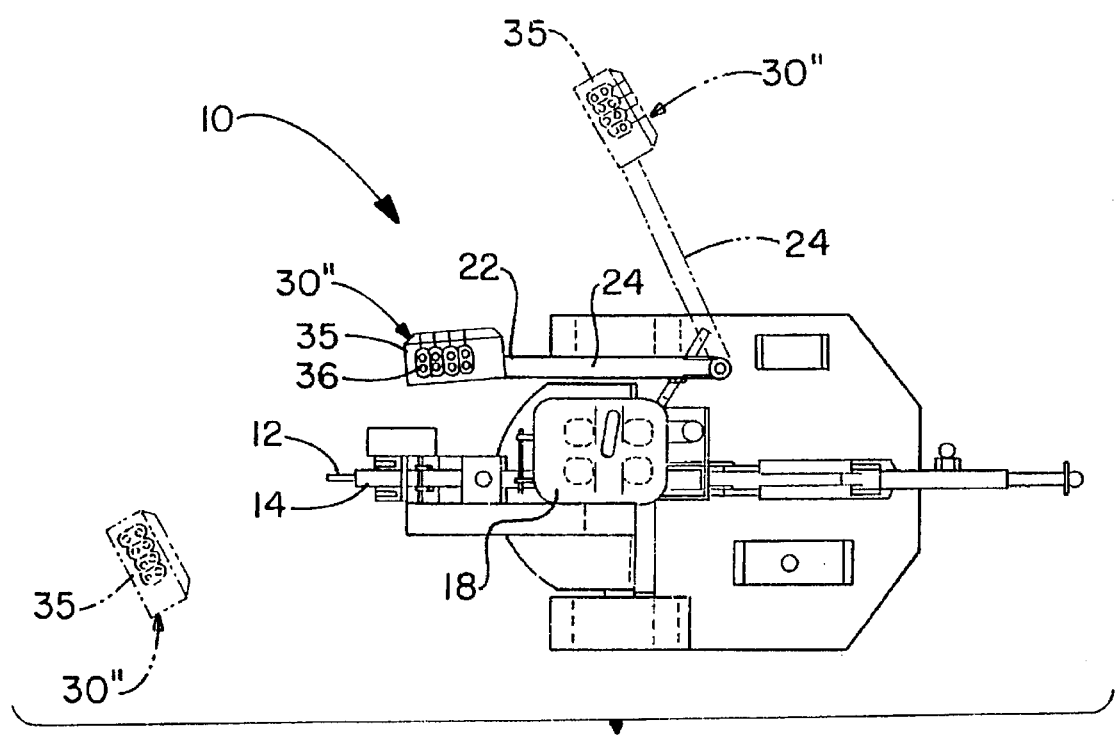
FIG. 4 is a top plan view of a further alternative embodiment of the invention.

In FIG. 4, a further alternative embodiment of the invention is shown wherein a protective operator's station 30" as shown in either FIG. 2 or 3 is releasably attached to boom 24 of stump cutter 10 so that it may be used while attached to boom 24 where conditions permit, and may be detached or substantially detached from boom 24 if the operator desires to position the operator's station 30" in a location that would be unreachable utilizing boom 24.

It can be seen from the foregoing that a protective operator's station is provided to allow an operator of a flying debris generating machine to safely and effectively operate the machine from a position detached from the machine being controlled, except that control wires, cables, hydraulic lines may be utilized to connect the control panel to the machine being controlled, if desired. The invention provides a safe, lightweight, and easily transportable operator's station for remotely controlling any such machine. While the invention has been described primarily with reference to a stump cutter, it is not meant to be limited for use with stump cutters, and may be used in conjunction with any machine that may cause flying debris, including, but not limited to, augers, drills, rock and concrete cutting machines, and other similar machines. Although the foregoing description has set forth the preferred embodiment of the invention in particular detail, it must be understood that numerous modifications, substitutions, and changes may be undertaken without departing from the true spirit and scope of the present invention as defined by the ensuing claims.

What is claimed is:

1. A protective operator's station for a remotely controlled cutting machine, said operator's station comprising:
   a control panel detached from said machine and including at least one machine control switch;
   means for wireless transmission of machine control signals from said detached protective operator's station to said remotely controlled machine;
   a base, detached from said machine being controlled for supporting said control panel in a position desired by an operator, said base including at least one support leg for supporting said control panel above a surface; and,
   a substantially transparent shield extending upward from said control panel for shielding an operator from flying debris generated by said cutting machine.

2. A protective operator's station as recited in claim 1, wherein said at least one support leg of said base is Selectively extensible to vary the vertical position of said control panel relative to said surface.

3. A protective operator's station as recited in claim 1, wherein said base is a folding tripod.

4. A protective operator's station as recited in claim 3, wherein said tripod includes selectively extensible legs to provide said means for varying the vertical position of said control panel.

5. A protective operator's station as recited in claim 1, wherein said control panel is rotatably connected to said base to allow said control panel to be rotated relative to said base.

6. A protective operator's station as recited in claim 1, further comprising a skirt extending downward from said control panel to protect a machine operator.

7. A protective operator's station as recited in claim 6, wherein said skirt is a flexible material so as to extend downward from said control panel without substantially interfering with said base.

8. A protective operator's station as recited in claim 7, wherein said skirt is made of rubber.

9. An improved stump cutter having a rotating cutting wheel mounted on an end of a curing boom, said cutting wheel including a plurality of cutting teeth circumferentially secured about the periphery of said cutting wheel, and a power source for powering said cutting wheel, wherein the improvement comprises:
   a protective operator's station, releasably attached to said stump cutter and including a control panel having at least one machine control switch, and shield means, including at least a first shield extending upward from said control panel and a second shield extending downward from said control panel for shielding at least a portion of said operator from flying debris generated by said stump cutter, and
   at least one support leg extending downward from said control panel for supporting said protective operator's station above a surface, whereby
   said protective operator's station is selectively detachable from said stump cutter as required during stump cutting operations, such that said stump cutter is remotely controlled from said selectively detached protective operator's station.

10. An improved stump cutter as recited in claim 9, wherein said second shield is a flexible skirt.

11. An improved stump cutter as recited in claim 9, wherein said at least one support leg is provided by folding tripod having selectively extensible legs.

12. An improved stump cutter as recited in claim 9, further comprising harness means for securing said protective operator's station to an operator's body.

13. In combination with a stump cutter, a protective operator's station for remotely controlling said stump cutter, said protective operator's station comprising:
   A control panel supported on a base and detached from said stump cutter, said control panel having at least one machine control switch for remotely controlling said stump cutter;
   at least one support leg connected to said base for supporting said control panel above a surface;
   means for wireless transmission of stump cutter control signals generated in response to operator manipulation of said at least one machine control switch from said detached operator's station to said stump cutter; and, a substantially transparent shield extending upward from said control panel for deflecting flying debris generated by said stump cutter.

14. The combination as recited in claim 13, further comprising a shield extending downward from said control panel to deflect flying debris generated by said stump cutter.

* * * * *